(12) United States Patent
Niwa et al.

(10) Patent No.: US 10,981,133 B2
(45) Date of Patent: Apr. 20, 2021

(54) CHEMICAL SYNTHESIS DEVICE

(71) Applicant: TORAY ENGINEERING CO., LTD., Tokyo (JP)

(72) Inventors: Tsukasa Niwa, Otsu (JP); Chisa Inaka, Otsu (JP)

(73) Assignee: TORAY ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 16/634,763

(22) PCT Filed: Jun. 28, 2018

(86) PCT No.: PCT/JP2018/024673
§ 371 (c)(1),
(2) Date: Jan. 28, 2020

(87) PCT Pub. No.: WO2019/026494
PCT Pub. Date: Feb. 7, 2019

(65) Prior Publication Data
US 2020/0179890 A1    Jun. 11, 2020

(30) Foreign Application Priority Data
Aug. 3, 2017 (JP) .............................. JP2017-150356

(51) Int. Cl.
*B01J 4/00*    (2006.01)
*B01J 19/00*   (2006.01)
*B01J 19/24*   (2006.01)

(52) U.S. Cl.
CPC ........... *B01J 4/008* (2013.01); *B01J 19/0006* (2013.01); *B01J 19/24* (2013.01); *B01J 2204/005* (2013.01); *B01J 2219/00162* (2013.01); *B01J 2219/00729* (2013.01)

(58) Field of Classification Search
CPC ...... B01J 19/0006; B01J 19/24; B01J 19/245; B01J 19/0046; B01J 4/008; B01J 2219/00162; B01J 2219/00729; B01J 2219/0072; B01J 2204/005
See application file for complete search history.

(56) References Cited

U.S. PATENT DOCUMENTS 3,647,390 A  *  3/1972  Kubodera ............ B01J 19/0046
                                              422/129

OTHER PUBLICATIONS

International Search Report of the corresponding International Application No. PCT/JP2018/024673, dated Aug. 28, 2018.

\* cited by examiner

*Primary Examiner* — Lessanework Seifu
(74) *Attorney, Agent, or Firm* — Global IP Counselors, LLP

(57) ABSTRACT

A chemical synthesis device includes a reaction vessel, a waste liquid tank and an intermediate container. A chemical is supplied to the reaction vessel. The waste liquid tank is configured to hold waste liquid discharged from the reaction vessel. The intermediate container has a smaller capacity than the waste liquid tank. The intermediate container is provided between the reaction vessel and the waste liquid tank, via a waste liquid pipe. The pressure of the intermediate container is adjusted to adjust the flow supplied to the reaction vessel and the flow discharged from the reaction vessel.

14 Claims, 5 Drawing Sheets

CHEMICAL SYNTHESIS DEVICE

CROSS-REFERENCE TO RELATED APPLICATIONS

This application is a U.S. National stage of International Application No. PCT/JP2018/024673, filed on Jun. 28, 2018. This application claims priority to Japanese Patent Application No. 2017-150356 filed on Aug. 3, 2017 with Japan Patent Office. The entire disclosure of Japanese Patent Application No. 2017-150356 is hereby incorporated herein by reference.

BACKGROUND

Field of the Invention

The present invention relates to a chemical synthesis device in which a plurality of chemicals are reacted and synthesized.

Background Information

With a chemical synthesis device that chemically synthesizes proteins, peptides, polymers, nucleic acids and the like, chemical synthesis is performed by supplying a plurality of chemicals (reagents) to a reaction vessel. For example, when synthesizing a nucleic acid, numerous beads are put in the reaction vessel, and while chemicals are sequentially supplied to the reaction vessel, detritylation, coupling, oxidation, capping, and other such treatments are repeatedly performed to bond bases to the beads one after another.

An example of a known chemical synthesis device such as this is the chemical synthesis device described in Japanese Translation of PCT International Application Publication No. 2002-518526 (Patent Literature 1). FIG. 5 is a piping route diagram of a typical chemical synthesis device. This chemical synthesis device comprises a reaction vessel 100 to which chemicals are supplied, a chemical tank 101 for holding the chemicals supplied to the reaction vessel 100, and a waste liquid tank 102 for holding the waste solution discharged from the reaction vessel 100. These are linked by pipes 103. The chemicals are supplied from the chemical tank 101 to the reaction vessel 100, where they undergo chemical synthesis with the chemicals in the reaction vessel 100, and finally the product is discharged to the waste liquid tank 102. The supply of chemicals to the reaction vessel 100 and the discharge from the reaction vessel 100 are performed by a pressurizing means 104 of the chemical tank 101. That is, the pressurizing means 104 has a gas tank 104a filled with high-pressure gas, and when this high-pressure gas is supplied to the chemical tank 101, the inside of the chemical tank 101 is pressurized and the chemicals are supplied to the reaction vessel 100. The pressurized chemicals are chemically flow into the reaction vessel 100 while being synthesized in the reaction vessel 100, and the reacted chemical and any excess chemicals are discharged into the tank 102 by the pressurization of the chemical tank 101 by the pressurizing means 104. In the example shown in FIG. 5, only one chemical tank 101 is shown, but actually, many chemical tanks 101 are provided, in a number of types, and the system is designed so that the chemicals necessary for chemical synthesis are selected and supplied to the reaction vessel 100.

SUMMARY

However, a problem with the above chemical synthesis device was that it was difficult to adjust the supply amount and discharge amount of the chemical according to the process. With the above chemical synthesis device, the liquid is fed only by the pressurizing means 104 on the inflow side, so there is a limit to the adjustment of the chemical feed rate. Therefore, when synthesizing chemicals with a low reaction rate, for example, it takes a long time for the chemicals to react, but in actual practice, in order to buy time for the reaction, the chemicals had to be introduced in an amount larger than necessary to buy apparent reaction time for the synthesis. In addition, before performing a new chemical synthesis, the reaction vessel 100 is flushed out with a cleaning liquid, if it takes a long time for the cleaning liquid to flow in and out, this can be a problem in that it can lower the operating rate of the chemical synthesis device.

In order to solve this problem, the waste liquid tank 102 is also provided with a pressurizing means, a negative pressure means, etc., which allows the pressure differential between the inflow and outflow sides of the reaction vessel 100 to be adjusted, and the feed rate of the chemical, etc., to be adjusted. However, since the waste liquid tank 102 holds the waste liquids from various processes, it has a much larger volume than the reaction vessel 100. Therefore, when the pressure of the waste liquid tank 102 is to be adjusted, high-output devices are required for the pressurizing means and the negative pressure means, and a problem is that the chemical synthesis device ends up being bulkier overall.

The present invention was conceived in light of the above problems, and it is an object thereof to provide a chemical synthesis device with which the flow of a chemical supplied to a reaction vessel and the flow discharged from the reaction vessel can be adjusted without increasing the size of the entire device.

In order to solve the above problems, a chemical synthesis device of the present invention comprises a reaction vessel to which chemicals are supplied, and a waste liquid tank for holding the waste liquid discharged from the reaction vessel, wherein an intermediate container having a smaller capacity than the waste liquid tank is provided between the reaction vessel and the waste liquid tank, via a waste liquid pipe, and the pressure of this intermediate container is adjusted to adjust the flow supplied to the reaction vessel and the flow discharged from the reaction vessel.

With the above chemical synthesis device, the flow supplied to the reaction vessel and the flow discharged from the reaction vessel can be adjusted by adjusting the pressure of the intermediate container provided between the reaction vessel and the waste liquid tank. That is, since the intermediate container is disposed on the outflow side of the reaction vessel, the pressure of the intermediate container can be adjusted to adjust the pressure differential between the inflow and outflow sides of the reaction vessel, and to adjust the feed rate of the chemical, etc. And since the intermediate container is formed smaller than the waste liquid tank, the output of the pressurizing means, the negative pressure means, etc., for adjusting the pressure of the intermediate container can be made smaller than in the case of adjusting the pressure of the waste liquid tank. Therefore, since the pressurizing means, the negative pressure means, and other such devices can be made more compact, the flow of the chemicals supplied to the reaction vessel and the flow that is discharged from the reaction vessel can be adjusted without increasing the size of the overall chemical synthesis device.

In a specific mode of the above-mentioned chemical synthesis device, the configuration can be such that a pressure regulator for adjusting the pressure of the intermediate container is provided with to the intermediate container.

With this configuration, for example, the pressure of the intermediate container can be easily adjusted by using a pressure regulator such as a vacuum pump or a back pressure valve.

Also, if the intermediate container is provided with a plurality of pressure regulators having different pressure adjustment amounts, these pressure regulators can be switched so that the pressure of the intermediate container is adjusted by the selected pressure regulator.

With this configuration, the pressure of the intermediate container can be adjusted by selecting the pressure regulator, and in turn, the flow supplied to the reaction vessel and the flow discharged from the reaction vessel can be selectively adjusted.

Also, the configuration may be such that a waste liquid shutoff valve is provided to the pipe linking the intermediate container and the waste liquid tank, and the waste liquid shutoff valve and the pressure regulator are selectively switched so that the pressure of the intermediate container is adjusted to the same pressure as the waste liquid tank or to the pressure adjusted by the pressure regulator.

With this configuration, the flow of the chemicals supplied to the reaction vessel and the flow discharged from the reaction vessel can be easily adjusted according to the application by selectively switching between the waste liquid shutoff valve and the pressure regulator.

Also, the configuration may be such that a chemical tank is provided for holding the chemicals that are supplied to the reaction vessel, and a gas supply pipe for supplying a gas to pressurize this chemical tank is provided with a pressure reducing valve for adjusting the pressure of this gas supply pipe.

With this configuration, since the inflow side of the reaction vessel can be depressurized, the pressure differential between the inflow and outflow sides of the reaction vessel can be adjusted more precisely.

Also, the configuration may be such that the intermediate container has a larger capacity than the reaction vessel.

With this configuration, since all the chemicals supplied to the reaction vessel can be transferred to the intermediate container, the chemicals in the reaction vessel can be discharged all at once.

With the chemical synthesis device of the present invention, the flow of a chemical supplied to a reaction vessel and the flow discharged from the reaction vessel can be adjusted without increasing the size of the entire device.

DETAILED DESCRIPTION OF EMBODIMENTS

An embodiment of the chemical synthesis device of the present invention will be described with reference to the drawings.

Figure 1:
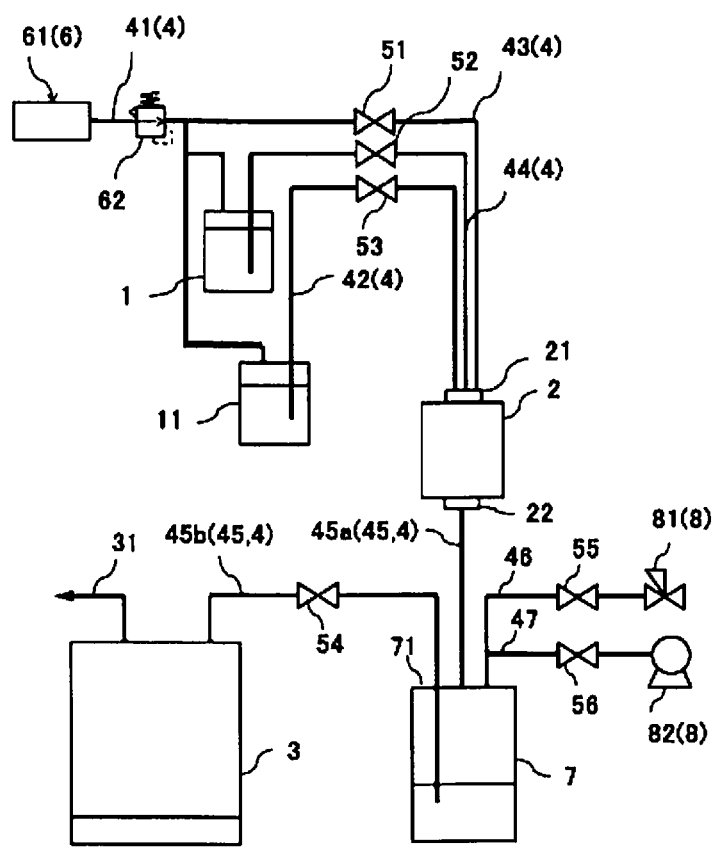
FIG. 1 is a schematic piping route diagram of the chemical synthesis device of the present invention.

FIG. 1 is a piping route diagram of the chemical synthesis device in an embodiment of the present invention.

As shown in FIG. 1, the chemical synthesis device comprises a chemical tank 1 in which chemicals are stored, a reaction vessel 2 in which the chemicals are synthesized, and a liquid waste solution tank 3 that holds the liquid waste discharged from the reaction vessel 2. These components are linked by pipes 4. When chemicals are supplied from the chemical tank 1 to the reaction vessel 2, the chemicals are chemically synthesized in the reaction vessel 2, and the product of the chemical synthesis is discharged to the waste solution tank 3. For example, in the case of synthesizing a nucleic acid, a large number of beads are put into the reaction vessel 2, and treatments such as detritylation, coupling, oxidation, and capping are repeatedly performed while sequentially supplying the chemicals to the reaction vessel 2, to bond bases to the beads one after another.

The chemical tank 1 is for storing the chemicals that serve as reagents of the chemical synthesis. In the example in FIG. 1, one chemical tank 1 is depicted, but usually a plurality of chemical tanks 1 are provided, and each chemical tank 1 is linked to the reaction vessel 2 by an independent liquid supply pipe 44. That is, a plurality of types of chemical can be supplied to the reaction vessel 2 without being mixed. Each of these liquid supply pipes 44 is provided with a shutoff valve 52, and by opening a shutoff valve 52, only the selected chemical can be supplied to the reaction vessel 2 through the liquid supply pipe 44.

A pressurizing means 6 is connected to the chemical tank 1, and the chemicals in the chemical tank 1 are fed by the pressurizing means 6. The pressurizing means 6 has a gas tank 61 filled with a high-pressure gas, and a gas supply pipe 41 that links to the gas tank 61 and the chemical tank 1, and the gas from the gas tank 61 can be passed through this gas supply pipe 41 and supplied to the chemical tank 1. By supplying the gas in the gas tank 61, the pressure in the chemical tank 1 can be adjusted to the pressure in the gas tank 61, and the flow of the chemicals fed from the chemical tank 1 can be adjusted. That is, when the pressure differential between the chemical tank 1 and the reaction vessel 2 is increased, the feed rate of the chemicals fed from the chemical tank 1 increases and the amount of the chemicals can be increased. When the pressure differential between the chemical tank 1 and the reaction vessel 2 is decreased, the feed rate of the chemicals fed from the chemical tank 1 decreases and the amount of the chemicals can be reduced. The gas in the gas tank 61 is a gas that will not react with the chemicals in the chemical tank 1.

A pressure reducing valve 62 is provided to the gas supply pipe 41 that connects the gas tank 61 of the pressurizing means 6 and the chemical tank 1. This pressure reducing valve 62 is used for reducing the pressure of the pressurizing means 6 and adjusting the amount of chemicals fed from the chemical tank 1. This pressure reducing valve 62 can adjust the pressure in the pipe 4 by adjusting the amount released to the atmosphere, and affords more precise adjustment than when adjusting with just the gas tank 61. That is, by adjusting the gas supply amount with the pressure of the gas tank 61 while further reducing the pressure with the pressure reducing valve 62, the pressure in the pipe 4 can be precisely adjusted, and the amount of chemicals fed from the chemical tank 1 can be adjusted more precisely than when adjusting with just the gas tank 61. Furthermore, the lower limit to the chemical feed rate adjusted with juts the gas tank 61 can be further lowered, and as a result, enough time for the chemicals to react in the reaction vessel 2 is gained by extending how long the chemicals are fed to the reaction vessel 2.

In this embodiment, a cleaning liquid tank 11 that holds a cleaning liquid is provided. This cleaning liquid tank 11 is linked to the reaction vessel 2 by a cleaning liquid pipe 42 in the same manner as the chemical tank 1, and a shutoff valve 53 is provided to the cleaning liquid pipe 42. That is, when this shutoff valve 53 is opened, the cleaning liquid tank 11 communicates with the reaction vessel 2, and the cleaning liquid can be supplied to the reaction vessel 2.

Also, the pressurizing means 6 is connected to the cleaning liquid tank 11, and in this embodiment, the cleaning liquid tank 11 is configured to be shared with the pressurizing means 6 of the chemical tank 1. That is, the gas tank 61 of the pressurizing means 6 and the cleaning liquid tank 11 are connected downstream from the pressure reducing valve 62, and when the gas is supplied from the gas tank 61, the inside of the cleaning liquid tank 11 is pressurized and the cleaning liquid is fed to the reaction vessel 2. That is, the amount in which the cleaning liquid is supplied can be varied by adjusting the pressure differential between the cleaning liquid tank 11 and the reaction vessel 2 with the pressurizing means 6. In addition, just as with the chemicals, operating the pressure reducing valve 62 allows the amount in which the cleaning liquid is fed from the cleaning liquid tank 11 to be adjusted more precisely than when adjusting with just the shutoff valve 53.

The gas tank 61 of the pressurizing means 6 is linked to a forced discharge pipe 43 that is directly connected to the reaction vessel 2 on the downstream side of the pressure reducing valve 62. The gas in the gas tank 61 can be supplied directly to the reaction vessel 2 by the forced discharge pipe 43 to directly pressurize the reaction vessel 2. That is, the forcible discharge pipe 43 is provided with a shutoff valve 51, and when the gas is supplied with the shutoff valve 51 open, the gas can be supplied and pressurized in the reaction vessel 2. This generates a pressure differential between the reaction vessel 2 and the downstream side thereof, so the chemicals in the reaction vessel 2 can be forcibly discharged downstream. As with the chemical tank 1 and the cleaning liquid tank 11, operating the pressure reducing valve 62 allows the discharge amount of the chemical discharged from the reaction vessel 2, etc., to be adjusted more precisely than when the adjustment is made with just the shutoff valve 51.

Also, the reaction vessel 2 is used for chemically synthesizing the supplied chemicals and the like. The reaction vessel 2 in this embodiment has a cylindrical shape, and has an inflow-side supply port 21 to which chemicals and the like are supplied, and an outflow-side discharge port 22 from which unnecessary chemicals and the like are discharged. The supply port 21 is connected to the liquid supply pipe 44, to the forced discharge pipe 43, and to the cleaning liquid pipe 42, and when the desired shutoff valves 51, 52, or 53 is opened and the pressurizing means 6 is operated, the result is that chemicals, cleaning liquid, or the like is supplied. Also, a waste liquid pipe 45 is connected to the discharge port 22, and the chemicals or the like in the reaction vessel 2 can be discharged by operating the pressurizing means 6.

Also, the waste liquid tank 3 that holds the discharged chemicals or the like is provided on the downstream side (outflow side) of the reaction vessel 2. The waste liquid tank 3 is linked to the reaction vessel 2 by the waste liquid pipe 45, and the waste liquid discharged from the discharge port 22 of the reaction vessel 2 is fed through the waste liquid pipe 45 to the waste liquid tank 3. In this embodiment, the waste liquid pipe 45 is formed by a first waste liquid pipe 45a that links the reaction vessel 2 and an intermediate container 7 (discussed below), and a second waste liquid pipe 45b that links the intermediate container 7 and the waste liquid tank 3. When these are referred to collectively, they are simply referred to as the waste liquid pipe 45.

Also, the waste liquid tank 3 in this embodiment has a larger capacity than the reaction vessel 2, and is formed in a capacity large enough to hold a plurality of discharges from the reaction vessel 2. This reduces how often the waste liquid tank 3 has to be replaced when it becomes full, so the decrease in the operating rate for the overall chemical synthesis device can be reduced.

The waste liquid tank 3 is provided with an atmospheric release valve 31, and the inside of the waste liquid tank 3 is adjusted to atmospheric pressure. A waste liquid shutoff valve 54 is provided to the second waste liquid pipe 45b linking the waste liquid tank 3 and the intermediate container 7, and the liquid waste solution tank 3 and the intermediate container 7 can be made to communicate with each other by opening the waste liquid shutoff valve 54. As a result, when the chemical in the reaction vessel 2 is discharged, the waste liquid shutoff valve 54 is opened to adjust the intermediate container 7 and the liquid waste solution tank 3 to atmospheric pressure, and in this state the pressure of the reaction vessel 2 is raised above atmospheric pressure, which allows a pressure differential to be generated between the reaction vessel 2 and the waste liquid tank 3 to forcibly discharge the chemical.

The intermediate container 7 is provided between the reaction vessel 2 and the waste liquid tank 3. The intermediate container 7 is used for adjusting the flow of the chemicals and so forth supplied to the reaction vessel 2, and the flow of the waste liquid discharged from the reaction vessel 2. That is, by adjusting the pressure of this intermediate container 7, the pressure differential between the pressure on the upstream side of the reaction vessel 2 and the pressure on the downstream side (the pressure of the intermediate container 7) can be adjusted, and the rate and amount of inflow and outflow to and from the reaction vessel 2 can be adjusted.

The intermediate container 7 is a cylindrical sealed container and is formed in a capacity smaller than the capacity of the waste liquid tank 3. The first waste liquid pipe 45a connected to the reaction vessel 2 and the second waste liquid pipe 45b connected to the waste liquid tank 3 are connected to a lid 71 located on the upstream side of the intermediate container 7. Consequently, the waste liquid discharged from the reaction vessel 2 flows through the first waste liquid pipe 45a into the intermediate container 7, and flows through the second waste liquid pipe 45b into the waste liquid tank 3.

The lid 71 of the intermediate container 7 is provided with a pressure regulator 8 that adjusts the pressure of the intermediate container 7. In this embodiment, a back pressure valve 81 and a suction device 82 (such as a vacuum pump) are provided, and these are connected to the intermediate container 7. More specifically, the intermediate container 7 and the back pressure valve 81 are linked by a back pressure pipe 46, and the back pressure pipe 46 is provided with a back pressure shutoff valve 55. Opening the back pressure shutoff valve 55 subjects the intermediate container 7 to the back pressure that has been set. Consequently, when back pressure is applied to the intermediate container 7, the pressure in the intermediate container 7 goes up, so the pressure differential from the pressure on the upstream side of the reaction vessel 2 can be adjusted lower than when there is no back pressure valve 81. That is, when chemicals or the like are fed at a specific pressure, in a state in which the back pressure shutoff valve 55 is closed and no back pressure is applied, the chemicals will be supplied to the reaction vessel 2 at that specific pressure, but in a state in which the back pressure shutoff valve 55 is open and back pressure is applied to the intermediate container 7, back pressure will be applied to the downstream side of the reaction vessel 2, so the chemicals or the like will be fed to the reaction vessel 2 at the pressure obtained by subtracting the back pressure from the specific pressure. That is, when the back pressure shutoff valve 55 is opened, the pressure differential between the upstream and downstream sides of the reaction vessel 2 is reduced, so the flow of chemicals, etc., flowing into the reaction vessel 2 is reduced, and the feed of the chemicals, etc., can be slowed down.

Similarly, the intermediate container 7 and the suction device 82 are linked by a suction pipe 47, and a suction shutoff valve 56 is provided to the suction pipe 47. Opening the suction shutoff valve 56 applies the set negative pressure to the intermediate container 7, and depressurizes the intermediate container 7. Consequently, when the suction shutoff valve 56 is opened, the pressure in the intermediate container 7 goes down, so the pressure differential from the pressure on the upstream side of the reaction vessel 2 can be adjusted to be larger. That is, when chemicals or the like are supplied at a specific pressure, in a state in which the suction shutoff valve 56 is closed and no negative pressure is applied, the chemicals are fed to the reaction vessel 2 at that specific pressure, but in a state in which the suction shutoff valve 56 is opened and negative pressure is applied to the intermediate container 7, the downstream side of the reaction vessel 2 is reduced in pressure, so the chemicals or the like are fed to the reaction vessel 2 at a pressure further reduced from the specific pressure. That is, opening the suction shutoff valve 56 increases the pressure differential between the upstream side and the downstream side of the reaction vessel 2, so the flow of chemicals or the like flowing into the reaction vessel 2 is increased, and the feed of the chemicals or the like can be sped up.

Since the intermediate container 7 is formed to have a smaller capacity than the waste liquid tank 3, the capacity to be adjusted by the pressure regulators 8 can be made smaller than when the pressure regulator 8 is provided in the waste liquid tank 3. That is, the inflow and outflow to and from the reaction vessel 2 are adjusted by the pressure differential, but since the pressure on the downstream side of the reaction vessel 2 is adjusted by the intermediate container 7, which has a small capacity, the adjustment capacity of the pressure regulator 8 can be smaller than when the liquid waste solution tank 3 is adjusted with just the pressure regulator 8. As a result, a smaller pressure regulator 8 can be used, which helps keep the size and cost of the overall chemical synthesis device from increasing.

The intermediate container 7 in this embodiment is formed to have a capacity that is larger than the capacity of the reaction vessel 2. This allows the whole amount of the chemical or the like in the reaction vessel 2 to be discharged to the intermediate container 7 all at once.

Also, the chemical synthesis device is provided with a control device, and this control device controls the opening and closing of the various valves, the pressure of the pressurizing means 6 and the suction device 82, and so forth. A plurality of modes for controlling the pressure of the intermediate container 7 are switchably provided in order to efficiently feed the chemical or the like according to the usage situation of the chemical synthesis device. In this embodiment, an atmospheric pressure mode, a back pressure mode, and a suction mode are provided, and the back pressure shutoff valve 55, the suction shutoff valve 56, and the waste liquid shutoff valve 54 are controlled depending on these modes.

Figure 2:
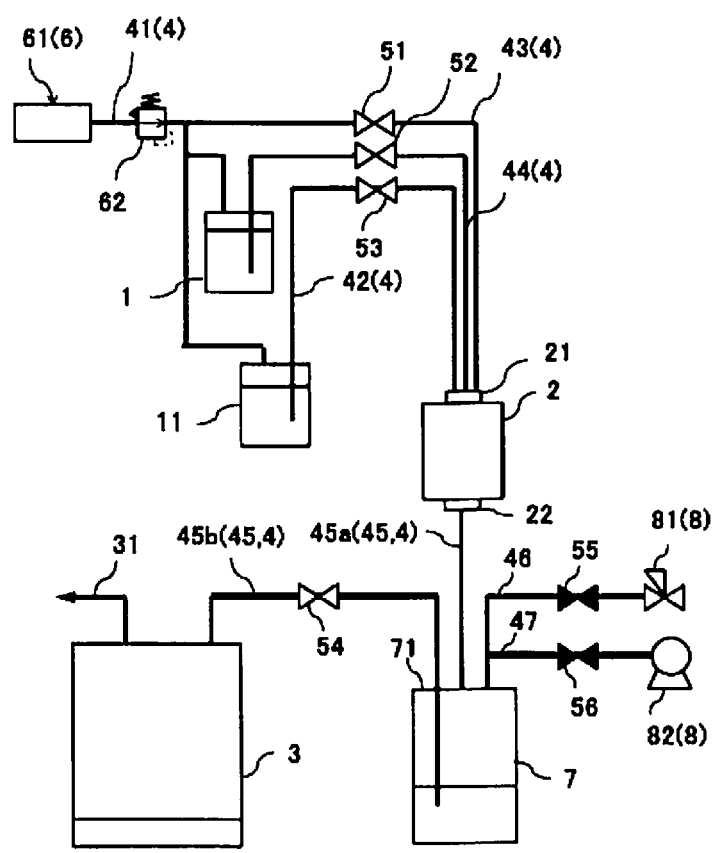
FIG. 2 is a diagram of the open and closed states of the valves when the chemical synthesis device is operated in atmospheric pressure mode.
Figure 3:
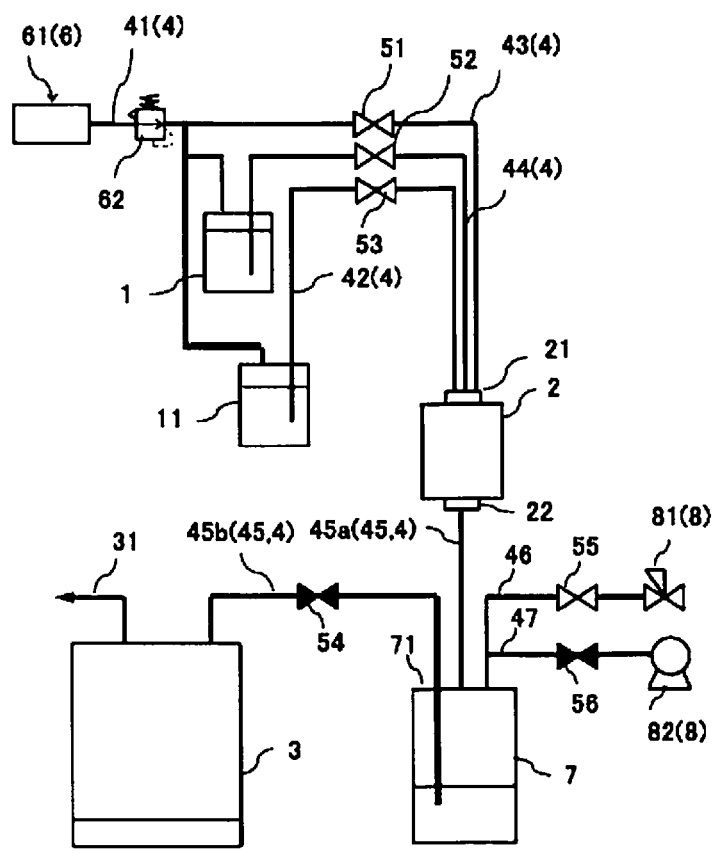
FIG. 3 is a diagram of the open and closed states of the valves when the chemical synthesis device is operated in back pressure mode.
Figure 4:
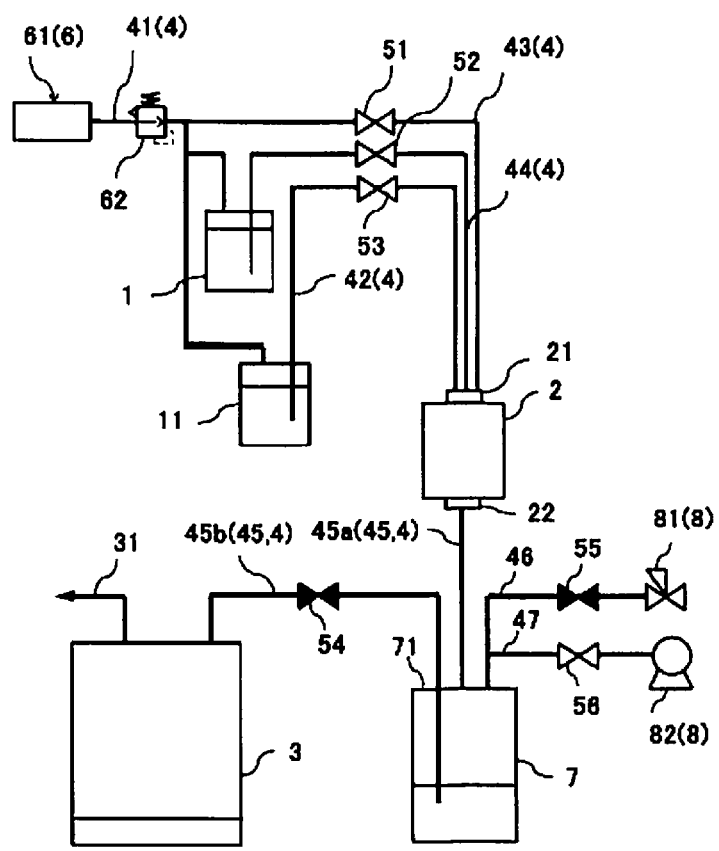
FIG. 4 is a diagram of the open and closed states of the valves when the chemical synthesis device is operated in suction mode.
Figure 5:
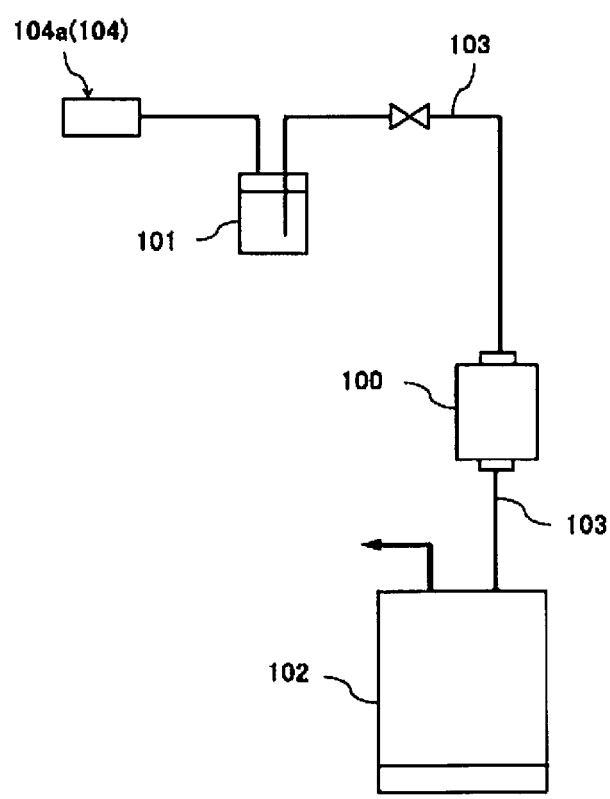
FIG. 5 is a piping route diagram of a conventional chemical synthesis device.

The atmospheric pressure mode is a mode in which normal liquid feed is performed, in which the intermediate container 7 set to atmospheric pressure, the feed to the reaction vessel 2 is adjusted with the pressure of the pressurizing means 6, and the pressure of the pressurizing means 6 acts directly on the chemicals, etc. In atmospheric pressure mode, as shown in FIG. 2, the waste liquid shutoff valve 54 is open, and the back pressure shutoff valve 55 and the suction shutoff valve 56 are closed. Consequently, since the intermediate container 7 is adjusted to the same atmospheric pressure as the waste liquid tank 3, by pressurizing the chemical tank 1 at a pressure equal to or higher than atmospheric pressure, the specific chemical can be supplied to the reaction vessel 2 at the feed rate corresponding to this pressure. In FIGS. 2 to 4, the back pressure shutoff valve 55, the suction shutoff valve 56, and the waste liquid shutoff valve 54 are shown black in a closed state and white in an open state.

This atmospheric pressure mode is used when chemicals are fed to the reaction vessel 2 in a normal state (fed by only the pressure of the pressurizing means 6 of the chemical tank 1) or when the chemical in the reaction vessel 2 is forcibly discharged. When the chemicals are fed in a normal state, the shutoff valve 52 of the liquid feed pipe 44 linked to the target chemical tank 1 is opened, and the chemical tank 1 is pressurized by the gas tank 61. Consequently, the pressure on the upstream side in the reaction vessel 2 is pressurized by the gas tank 61, and the downstream side is at atmospheric pressure, so the chemical feed rate and supply amount are determined by the pressure produced by the gas tank 61 and time.

When the chemical in the reaction vessel 2 is forcibly discharged, the gas tank 61 is pressurized in a state in which the shutoff valve 51 of the forced discharge pipe 43 is open and the shutoff valves 52 and 53 of the liquid feed pipe 44 and the cleaning liquid pipe 42 are closed. Consequently, in the reaction vessel 2, the pressure on the upstream side is at the pressure produced by the gas tank 61, and the downstream side is at atmospheric pressure, so the pressure produced by the gas tank 61 acts on the chemicals in the reaction vessel 2, which are discharged through the discharge port 22 and the first waste liquid pipe 45a into the intermediate container 7. Furthermore, by maintaining the pressurized state from the gas tank 61, the inside of the intermediate container 7 is pressurized, and the chemical or the like in the intermediate container 7 is discharged through the second waste liquid pipe 45b into the waste liquid tank 3.

The back pressure mode is a mode in which the feed of the chemicals or the like is slowed down, and is used when it is desired to take more time for chemical synthesis in the reaction vessel 2. In this back pressure mode, as shown in FIG. 3, the back pressure shutoff valve 55 is opened, and the waste liquid shutoff valve 54 and the suction shutoff valve 56 are closed. The back pressure valve 81 is then adjusted to a specific pressure. Consequently, in the reaction vessel 2, the upstream side is at the pressure produced by the gas tank 61, and the back pressure that has been set is applied to the downstream side, so the downstream side is adjusted to atmospheric pressure, and the pressure differential between the upstream side and the downstream side is smaller than in the atmospheric pressure mode. Therefore, the feed of the chemicals is slower than that in the atmospheric pressure mode, and how long it takes for the chemicals to reach the reaction vessel 2 can be made longer than in the atmospheric pressure mode. As a result, the chemical synthesis duration in the reaction vessel 2 can be increased, and the amount of chemicals supplied can be suppressed as compared with the conventional case in which chemicals that react slowly are continuously supplied to increase the chemical synthesis duration, so that the chemicals have time to react sufficiently.

Also, using the pressure reducing valve 62 allows the feed of the chemicals or the like to be further slowed down. That is, when the pressure reducing valve 62 is opened, the pressure produced by the gas tank 61 is reduced, so the pressure differential between the upstream and downstream sides of the reaction vessel 2 can be made even smaller than when the pressure reducing valve 62 is not actuated. Consequently, the reaction will take even more time than the above-mentioned reaction time, so even chemicals that react very slowly can be chemically synthesized.

The suction mode is a mode for speeding up the feed the chemicals or the like, and is used when the liquid feed time to the reaction vessel 2 is to be shortened. In this suction mode, as shown in FIG. 4, the suction shutoff valve 56 is opened, and the waste liquid shutoff valve 54 and the back pressure shutoff valve 55 are closed. The pressure in the intermediate container 7 is reduced by operating the suction device 82. As a result, in the reaction vessel 2, the pressure on the upstream side is increased by the gas tank 61, and a suction force is applied on the downstream side, so the pressure differential from the pressure on the upstream side of the reaction vessel 2 is increased. Therefore, the feed of the chemicals is faster than that in the atmospheric pressure mode, and how long it takes the chemicals or the like longer to reach the reaction vessel 2 can be shortened as compared to the atmospheric pressure mode. Consequently, since the feed time can be shortened, the cycle time of the chemical synthesis device can be improved. More specifically, after a specific chemical has been discharged from the reaction vessel 2, cleaning is required before the next chemical is supplied. In this case, the cleaning liquid is supplied to the reaction vessel 2 by switching to the suction mode. That is, the suction device 82 is operated while the shutoff valve 53 is open to effect pressurization with the gas tank 61, the result being that the pressure differential between the upstream and downstream sides of the reaction vessel 2 is larger than that in the atmospheric pressure mode, and the cleaning liquid is quickly fed to the reaction vessel 2. Since the cleaning liquid here is fed to the reaction vessel 2 at a high speed, the cleaning liquid supplied from the cleaning liquid pipe 42 to the reaction vessel 2 flows in with some force, so that any impurities adhering to the reaction vessel 2 are quickly flushed away, and the cleaning effect can be improved.

Thus, with the above-mentioned chemical synthesis device, the flow supplied to the reaction vessel 2 and the flow discharged from the reaction vessel 2 can be adjusted by adjusting the pressure of the intermediate container 7 provided between the reaction vessel 2 and the waste liquid tank 3. That is, since the intermediate container 7 is disposed on the outflow side of the reaction vessel 2, the pressure differential between the inflow and outflow sides of the reaction vessel 2 is adjusted by adjusting the pressure of this intermediate container 7, so the feed rate of the chemicals, etc., can be adjusted. Since the intermediate container 7 is formed smaller than the waste liquid tank 3, the outputs of the pressurizing means 6, the negative pressure means, etc., for adjusting the pressure of the intermediate container 7 can be made smaller than when adjusting the pressure of the waste liquid tank 3. Therefore, the pressurizing means 6, the negative pressure means, and other such devices can be reduced in size, so the flow of the chemicals supplied to the reaction vessel 2 and the flow discharged from the reaction vessel 2 can be adjusted without increasing the overall size of the chemical synthesis device.

In the above embodiment, an example was described in which the intermediate container 7 was provided with the pressure regulator 8, such as the suction device 82 and the back pressure valve 81, but the configuration may instead be such that the pressure regulator 8 is not provided, a hole is made in the lid 71 of the intermediate container 7, the hole diameter is made adjustable so that the pressure in the intermediate container 7 can be adjusted, and the flow of the chemicals supplied to the reaction vessel 2 can be adjusted. That is, when the gas in the intermediate container 7 is discharged from the hole while the waste liquid shutoff valve 54 is closed, the hole diameter can be adjusted to adjust the pressure loss, which allows the feed rate of the chemicals supplied to the reaction vessel 2 to be adjusted.

Also, in the above embodiment, an example was described in which two pressure regulators 8, namely, the suction device 82 and the back pressure valve 81, were used, but three or more pressure regulators 8 may be used, or only one pressure regulator 8 may be used.

Also, in the above embodiment, an example was described in which the mode could be switched among three modes: the atmospheric pressure mode, the back pressure mode, and the suction mode, but the number of modes may be increased, and the mode may be switched automatically to suit the situation. In order to simplify the device, only two of the above-mentioned three modes may be provided, as dictated by the situation. Also, the mode need not be switched automatically, and may instead be switched manually.

Also, in the above embodiment, an example was described in which the pressure reducing valve 62 was provided, but this pressure reducing valve 62 need not be provided if it is unnecessary in terms of the reaction time of the chemicals being used.

Also, in the above embodiment, an example was described in which the capacity of the intermediate container 7 was larger than the capacity of the reaction vessel 2, but the capacity of the intermediate container 7 may be even smaller than the capacity of the reaction vessel 2. With this configuration, it is more difficult to discharge the full amount of the chemical or other such waste liquid held in the reaction vessel 2 to the intermediate container 7 all at once, but by making the pressure regulator 8 even more compact, the overall size and cost of the device can be reduced.

The invention claimed is:
1. A chemical synthesis device, comprising:
a reaction vessel to which a chemical is supplied;
a waste liquid tank configured to hold waste liquid discharged from the reaction vessel; and
an intermediate container having a smaller capacity than the waste liquid tank, the intermediate container being provided between the reaction vessel and the waste liquid tank, via a waste liquid pipe, and the pressure of the intermediate container being adjusted to adjust the flow supplied to the reaction vessel and the flow discharged from the reaction vessel.
2. The chemical synthesis device according to claim 1, wherein
the intermediate container is provided with a pressure regulator for adjusting the pressure of the intermediate container.

3. The chemical synthesis device according to claim 1, wherein
the intermediate container is provided with a plurality of pressure regulators having different pressure adjustment amounts, and
the pressure regulators are switched so that the pressure of the intermediate container is adjusted by a selected pressure regulator.

4. The chemical synthesis device according to claim 1, further comprising
a chemical tank configured to hold the chemical that is supplied to the reaction vessel, and
a gas supply pipe configured to supply a gas to pressurize the chemical tank, the gas supply pipe being provided with a pressure reducing valve for adjusting the pressure of the gas supply pipe.

5. The chemical synthesis device according to claim 1, wherein
the intermediate container has a larger capacity than the reaction vessel.

6. The chemical synthesis device according to claim 2, further comprising
a waste liquid shutoff valve provided to a pipe linking the intermediate container and the waste liquid tank,
the waste liquid shutoff valve and the pressure regulator being selectively switched so that the pressure of the intermediate container is adjusted to the same pressure as the waste liquid tank or to the pressure adjusted by the pressure regulator.

7. The chemical synthesis device according to claim 3, further comprising
a waste liquid shutoff valve provided to a pipe linking the intermediate container and the waste liquid tank,
the waste liquid shutoff valve and the pressure regulators being selectively switched so that the pressure of the intermediate container is adjusted to the same pressure as the waste liquid tank or to the pressure adjusted by a selected pressure regulator selected from the pressure regulators.

8. The chemical synthesis device according to claim 2, further comprising
a chemical tank configured to hold the chemical that is supplied to the reaction vessel, and
a gas supply pipe configured to supply a gas to pressurize the chemical tank, the gas supply pipe being provided with a pressure reducing valve for adjusting the pressure of the gas supply pipe.

9. The chemical synthesis device according to claim 3, further comprising
a chemical tank configured to hold the chemical that is supplied to the reaction vessel, and
a gas supply pipe configured to supply a gas to pressurize the chemical tank, the gas supply pipe being provided with a pressure reducing valve for adjusting the pressure of the gas supply pipe.

10. The chemical synthesis device according to claim claim 6, further comprising
a chemical tank configured to hold the chemical that is supplied to the reaction vessel, and
a gas supply pipe configured to supply a gas to pressurize the chemical tank, the gas supply pipe being provided with a pressure reducing valve for adjusting the pressure of the gas supply pipe.

11. The chemical synthesis device according to claim 2, wherein
the intermediate container has a larger capacity than the reaction vessel.

12. The chemical synthesis device according to claim 3, wherein
the intermediate container has a larger capacity than the reaction vessel.

13. The chemical synthesis device according to claim claim 6, wherein
the intermediate container has a larger capacity than the reaction vessel.

14. The chemical synthesis device according to claim 4, wherein
the intermediate container has a larger capacity than the reaction vessel.

* * * * *